C. T. HUNT.
NUT LOCK.
APPLICATION FILED OCT. 13, 1911.
1,032,605.
Patented July 16, 1912.
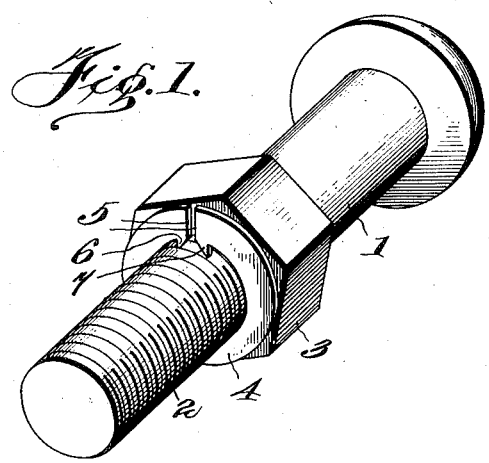
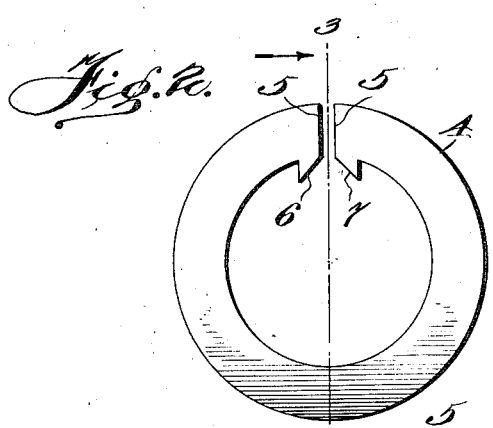
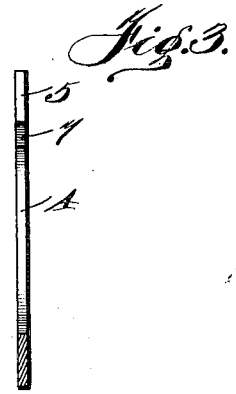
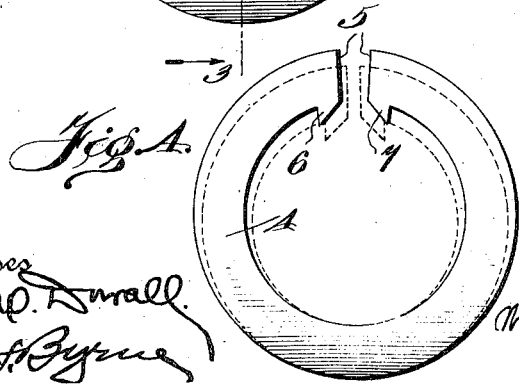
Witnesses
Inventor
Charles T. Hunt,
by Wilkinson, Fisher & Witherspoon,
Attorneys.

ated July 16, 1912.
UNITED STATES PATENT OFFICE.

CHARLES THOMAS HUNT, OF LOS ANGELES, CALIFORNIA.

NUT-LOCK.

1,032,605.  Specification of Letters Patent.  Patented July 16, 1912.

Application filed October 13, 1911. Serial No. 654,552.

*To all whom it may concern:*

Be it known that I, CHARLES T. HUNT, a citizen of the United States, residing at Los Angeles, in the county of Los Angeles and State of California, have invented certain new and useful Improvements in Nut-Locks; and I do hereby declare the following to be a full, clear, and exact description of the invention, such as will enable others skilled in the art to which it appertains to make and use the same.

My invention relates to improvements in nut locks, and is especially intended to provide a cheap, simple, and efficient nut lock, which may be readily applied and conveniently removed, which will not materially injure the threads of the bolt, and yet will effectively prevent the nut from turning backward during the ordinary usage of the bolt and nut.

My invention will be understood by reference to the accompanying drawings, in which—

Figure 1 is a perspective view of a bolt with the nut and nut lock applied thereto. Fig. 2 is an end view of the nut lock detached from the bolt. Fig. 3 shows a section along the line 3—3 of Fig. 2, and looking in the direction of the arrows, and Fig. 4 shows the nut lock in the expanded form in full lines, and in the normally closed, or holding form in dotted lines.

1 represents the bolt, having one or both ends screw-threaded as at 2, and the nut 3 is screwed over the screw-threaded portion in the usual way. 4 indicates the nut lock, which is preferably stamped out of resilient material, such as steel, and is cut away as at 5, and provided with oppositely disposed teeth 6 and 7. These teeth are so arranged that one or the other will catch in the groove between the threads of the bolt, and will cause the nut lock to hold the nut against turning.

The operation of the device is as follows:—The nut 3 is screwed onto the screw-threads 2 of the bolt 1, and then the ends of the nut lock are expanded, as by a wedge in the slot 5, and the nut lock is slipped in place up against the face of the nut. The wedge is then withdrawn, and the teeth are allowed to spring into engagement with the bolt. These teeth will project into the grooves between the screw-threads, and a slight blow on the two ends of the nut lock will cause the teeth to bite slightly into the bolt.

It will be obvious that the teeth 7 will tend to resist any movement of the nut lock 4 to the right (see Fig. 2), while the teeth 6 would resist any movement of the nut lock to the left, and thus these two teeth would serve as a positive lock against turning of the nut lock in either direction, thus adapting the lock to either right or left handed screw-threaded bolts.

The nut lock is shown expanded in full lines in Fig. 4, and in the closed position, when released, in dotted lines in said figure.

In order to remove the nut lock, it is only necessary to wedge the ends 5 apart, increasing the diameter of the nut lock, and permitting it to be withdrawn freely from the bolt.

Thus the nut lock may be readily attached, and as readily withdrawn, and the teeth 6 and 7 may be always applied in such a position that the free ends 5 of the nut lock may be convenient of access, either for hammering the teeth into engagement, or for spreading the same apart. Moreover, it will be noted that there are no projecting ends which are likely to be struck by any foreign body, or to be clogged up, decreasing the efficiency of the nut lock, and rendering it unreliable.

Having thus described my invention, what I claim and desire to secure by Letters Patent of the United States is:—

1. A nut lock consisting of a thin annular washer, with a narrow slot therein, and a tooth at each end of the slot projecting inwardly, and adapted to engage the bolt, substantially as described.

2. A nut lock consisting of a thin annular washer radially slotted, and provided with oppositely disposed teeth, one at each side of said radial slot, substantially as described.

In testimony whereof, I affix my signature, in presence of two witnesses.

CHARLES THOMAS HUNT.

Witnesses:
B. H. DAILEY,
H. T. McKEEVER.